Jan. 7, 1936. E. KINSELLA ET AL 2,026,740
EXTRUSION APPARATUS
Filed Oct. 27, 1933  2 Sheets-Sheet 2
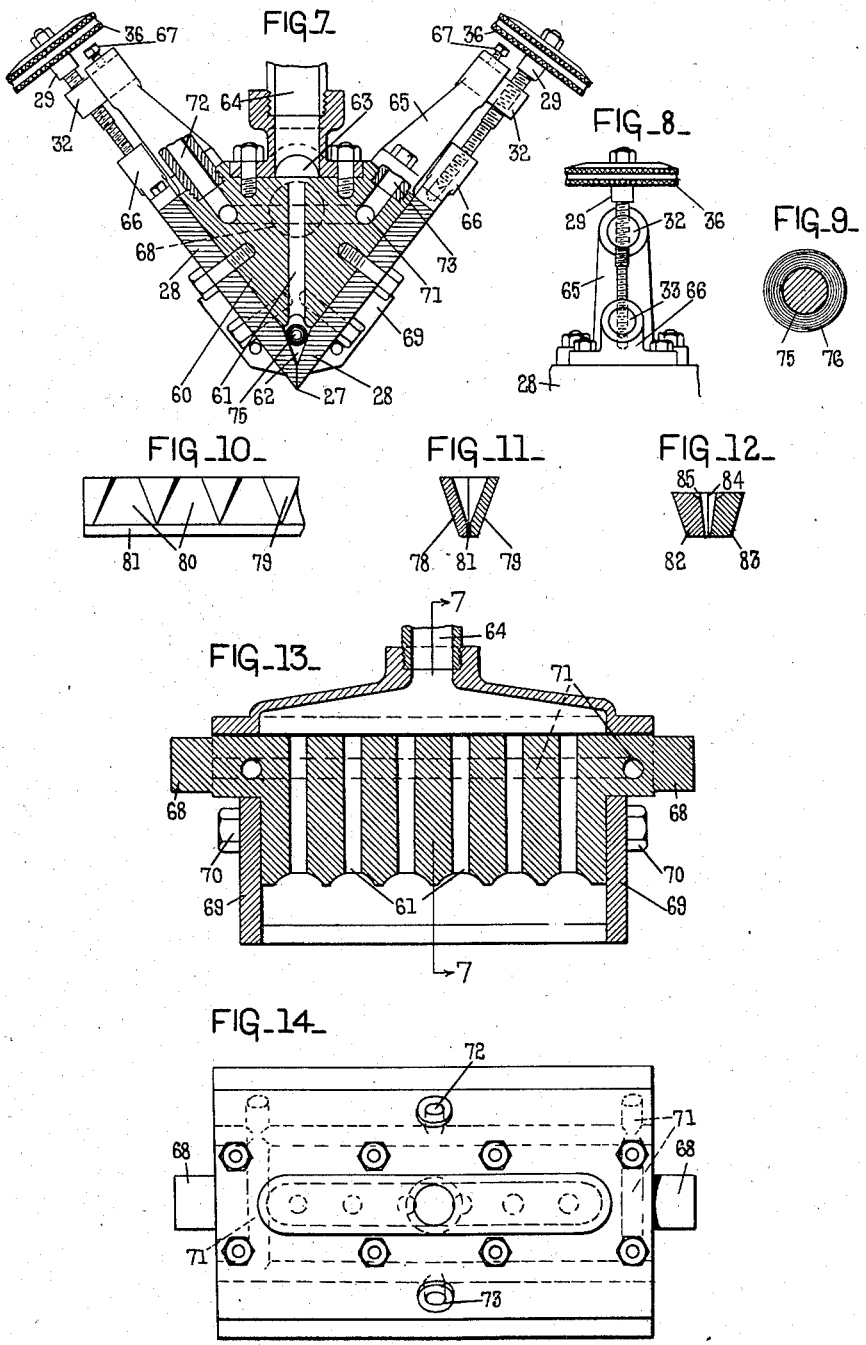

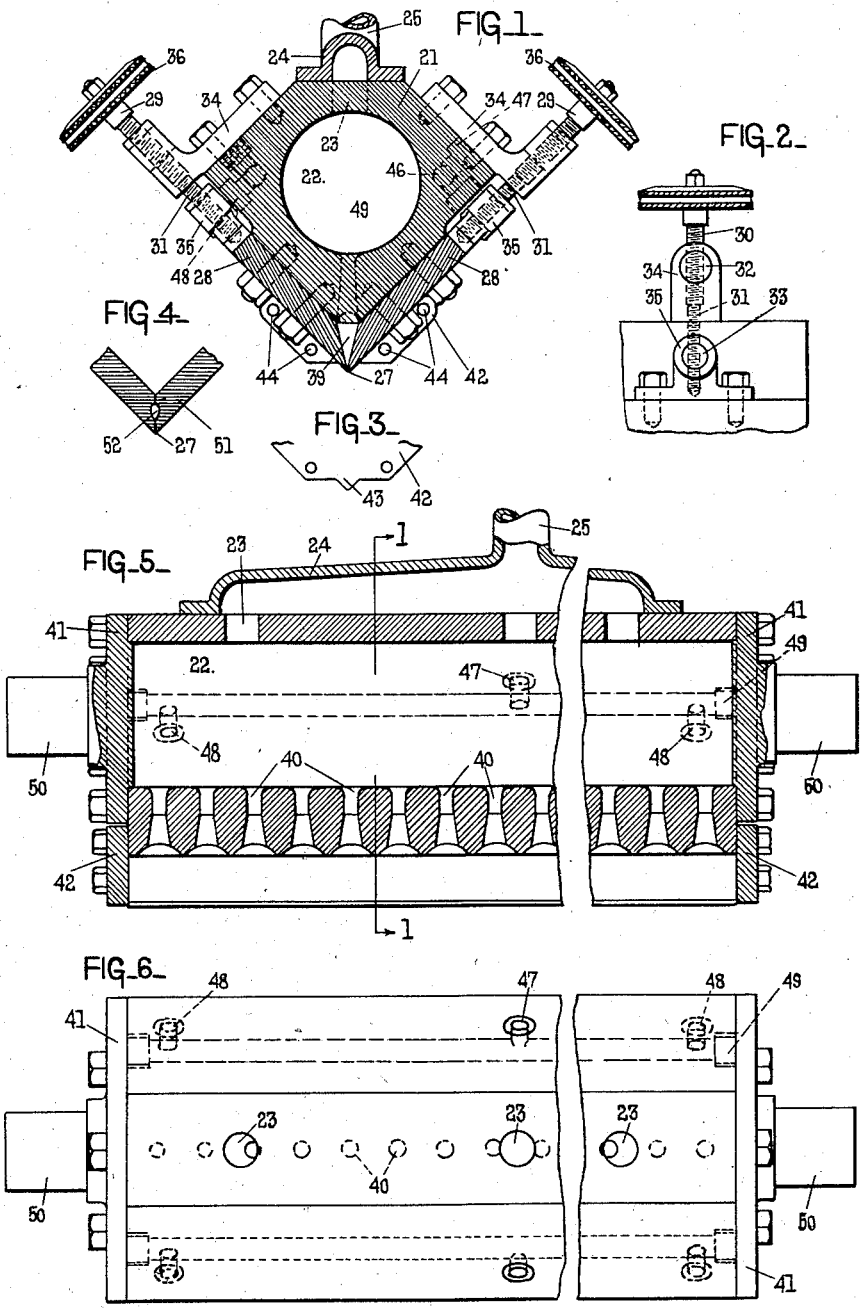

Patented Jan. 7, 1936

2,026,740

UNITED STATES PATENT OFFICE 2,026,740

EXTRUSION APPARATUS

Edward Kinsella and Robert Jabez Ward, Spondon, near Derby, England, assignors to Celanese Corporation of America, a corporation of Delaware Application October 27, 1933, Serial No. 695,390
In Great Britain November 10, 1932

9 Claims. (Cl. 18—15)

This invention relates to extrusion apparatus, and in particular to nozzles suitable for the extrusion of materials into thin sheets or films, especially films of great thinness such as are used for packing materials.

In the extrusion of such materials it is particularly important to ensure an even rate of discharge of the material over the whole length of the slit through which the solution or plastic material passes in order that the resultant sheet or film may be of uniform thickness throughout its width, or at any rate over its whole width with the exception of a narrow band at each edge, and also to impart a regular surface to the material. Consequently, as regards the extrusion apparatus two factors are of paramount importance, (a) that under working conditions the width of the slit should be uniform along its whole length, and (b) that the material to be extruded should be fed at a rate which is uniform over the whole length of the slit.

In the case of films intended for packing or wrapping purposes, the thickness of the film employed is very small, varying from 0.002 inch down to 0.0012, 0.0008, 0.0005 inch or less, and in consequence the dimensions of the slit cannot be permitted to vary by more than very small fractions of an inch, and great care has to be taken in the manufacture of the extrusion nozzle. Thus, the width of the slit must be made accurate to within very small margins of error of the order of less than 0.0001 inch, while the interior surface of the slit must be made very smooth.

It is, however, of great advantage in the manufacture of such materials to deliver a plastic material or solution to the slit under pressure. For example, where the material is in the form of a plastic mass, its viscosity may be such as to require high pressures to produce extrusion, while when the material is in the form of a solution, benefits may be obtained (e. g. a reduction of the amount of solvent to be removed and recovered), by using solutions of high concentration, and consequently high viscosity, and fairly high pressure is necessary to force such solutions through the orifice. Under such conditions the pressure applied to cause the solution to pass through the orifice acts transversely on the two walls of the orifice, and tends to force them apart, and it is found in practice that considerable deflection results from this pressure, thus varying the width of the orifice, and consequently the thickness of the extruded material.

The principal object of the present invention is to provide an extrusion apparatus in which this tendency to deflection is overcome, or at any rate reduced to such a small degree that the extruded product is substantially uniform in thickness.

According to the principal feature of the invention, therefore, the extrusion apparatus comprises a solid body or block of material in which or on which is formed the extrusion slit proper, the body or block being formed with a longitudinal passage running over the length of the extrusion orifice and communicating therewith through a series of smaller passages. The block is of substantial cross-section so as to form a rigid support for the two walls of the extrusion orifice, and this, in conjunction with the support offered by the material of the block between adjacent communicating passages, resists separation of the orifice under the pressure of the fluid material passing to and through the orifice. Thus, instead of the two sides of the orifice being substantially independent, they are firmly bonded together at intervals so close that whatever deflection results from the internal pressure is of very small amount and insufficient to affect the quality of the extruded product.

The longitudinal passage is of large cross-section, so that the kinetic energy of the material applied thereto under pressure is almost entirely transformed into pressure energy, and the material then under uniform pressure throughout the passage passes uniformly through each of the communicating passages (which should all have the same dimensions) to the extrusion orifice.

A large number of communicating passages can be provided without disturbing the rigidity of the block, so that the material is divided into a large number of equal streams flowing at the same rate to the orifice. In this way, the material is fed to the orifice over its whole length at a rate which is nearly uniform.

Further precautions must, however, be taken to ensure true uniformity of the quantity of material passing through each portion of the length of the slit, as will appear hereafter.

Such a block as above described is conveniently of square section, with the extrusion orifice arranged along one edge of the block. The faces of the block adjacent to this edge form firm supports for a pair of plates having their adjacent edges almost meeting to leave a gap of required width for the passage of the extruded material. Conveniently the edge of the block is cut away immediately behind the slit formed by the two plates so as to form a chamber of small cross-section into which the material is fed for passage to the slit. The opposed faces of the two plates may be so bevelled as to form a converging passage from this longitudinal chamber to the slit proper.

The width of the slit may be adjusted by sliding the plates, e. g. by means of micrometer screws, on the faces of the block to which they are secured, the plates being accurately guided and supported on the block, and their operative faces being carefully machined and finished so that the two walls of the slit are parallel to each other.

Along the length of the block is a cylindrical passage of large cross-section, to one end of which the material to be extruded is supplied by any suitable means under the pressure required, the other end of the passage being closed. Between this passage and the longitudinal chamber behind the slit are bored a large number of relatively small passages of equal diameter to distribute material from the large passage evenly to the slit. Preferably the mouths of these passages are flared so as to permit the material to distribute itself over the longitudinal passage and lose as far as possible the small amount of kinetic energy set up in it on its way through the passages.

The block of square cross-section above described is convenient in affording a simple and rigid support for the plates forming the extrusion orifice and in permitting easy adjustment without disturbing the rigidity afforded.

Passages for heating or cooling fluid may be formed in the material of the block, e. g. in the case of a square section block, in the corners of the block not occupied by the passages distributing the material to the orifice. The block may have a uniform cross-section throughout its length since each section of the block sufficiently supports the part of the orifice formed in that section and any need for providing greater support at the middle of the slit than at the ends is obviated. The orifice plates should be secured to the block at very frequent intervals, for example, at intervals corresponding to the spacing of the communicating passages.

With the arrangement above described of a large number of passages distributing the material from the main passage where substantially uniform pressure conditions prevail to the space immediately behind the slit, each unit length of the slit served by a communicating passage receives the material at the same rate as the other unit lengths along the slit. It is found in practice, however, that the division of the material in this way makes itself shown on extrusion, so that although distortion of the orifice is prevented by the support offered by the block, slight inequalities of thickness appear at intervals corresponding to the several passages. According to a further important feature of the invention therefore, such inequalities are avoided by the interposition between the termination of the passages and the slit of a member which divides each stream of material into a very large number of fine streams. Such member may take the form of a very finely perforated plate disposed in the longitudinal chamber behind the slit, or, and preferably, it may be formed as a cylinder of perforated material or very fine wire gauze. This member may be carried by a pair of ledges provided in the block itself along the sides of the longitudinal chamber, or it may more simply be supported by resting against the interior edges of the two plates forming the slit, so that all the material is forced to pass through the interstices of the member. The finer the interstices, the greater the sub-division of the several streams of material, and the less the chance of variation between the several streams.

The nozzle according to the invention achieves great uniformity in the delivery of the material over the width of the slit, and by accurate control over the amount of material fed to the extrusion apparatus, sheets or films having great uniformity over their length as well as over their width may be obtained.

It is desirable to employ a pump to force the material to the slit, especially where materials of high or very high viscosity are to be employed, and in order to ensure close uniformity in the amount of material, especially over long periods, the pumping means may be provided with control devices to maintain the output constant. Preferably gear pumps are employed for delivering materials under pressure, since such pumps have themselves a high degree of uniformity of output, and are very little subject to wear. Suitable control means for the pressure pumps are described in U. S. Patents Nos. 1,477,850 and 1,884,737, according to which the pressure on the two sides of a measuring pump working at a steady rate are maintained equal under the control of pressure balance valves, so maintaining the output of the pump uniform. A filter may be arranged between the pump or other pressure means to free the solution from matter likely to reduce the quality of the extruded material.

The apparatus according to the invention may be employed for the extrusion of material either into a coagulating bath, or into an evaporative atmosphere. For example, it may be used for the extrusion of viscose or cuprammonium solutions, in which case materials should be used which resist corrosion by the solutions, or solutions of cellulose acetate or other cellulose derivatives into coagulating baths. Again, it may be used for the extrusion of plastic materials containing pyroxylin, cellulose acetate, or other cellulose derivatives with or without pigments, fillers or the like either into an evaporative atmosphere or into a setting bath, or for the extrusion of solutions of cellulose acetate or other cellulose derivatives, for example organic cellulose derivatives such as cellulose esters, e. g. cellulose acetate, formate or propionate, or cellulose ethers, e. g. ethyl, methyl and benzyl cellulose, into an evaporative atmosphere.

Extrusion may take place on to drums or bands having a metallic or other smooth surface, e. g. a polished metal band as described in U. S. application S. No. 651,159 filed 11th January, 1933, or as described in U. S. applications S. Nos. 666,655 and 666,656 both filed 18th April, 1933, extrusion may be effected into a coagulating bath some distance from a drum or other support which receives the material after initial coagulation.

By way of example some forms of extrusion apparatus according to the present invention will now be described in greater detail with reference to the accompanying drawings in which Figure 1 is a sectional end elevation of an extrusion apparatus;

Figures 2, 3 and 4 are details of Figure 1;

Figures 5 and 6 are a sectional side elevation and a plan view respectively, of the apparatus shown in Figure 1;

Figure 7 is a sectional end elevation of a further form of the extrusion apparatus according to the invention;

Figures 8 to 12 illustrate details in connection with Figure 7; and

Figures 13 and 14 are a sectional side elevation and a plan view respectively, of the apparatus shown in Figure 7.

Referring to Figures 1 to 6, an extrusion apparatus comprises a solid block of metal 21 of square cross-section longitudinally through which an internal passage 22 is bored, the passage 22 communicating by three openings 23 with a manifold 24 secured to the top of the block 21 and supplied by means of a pipe 25 with the spinning solution to be extruded. The extrusion slit 27 is formed between the edges of two plates 28 which are carried upon the two lower faces of the diagonally disposed block 21.

The width of the slit 27 is adjusted by sliding the two plates 28 towards or away from one another by means of the micrometer screws 29. Another view of the micrometer screw mechanism is given in Figure 2. The screw 29 is made in two parts 30, 31 which are of the same hand but of slightly different pitch and engage with trunnions 32, 33 mounted upon brackets 34, 35 secured to the block 21 and the plate 28 respectively. The rotation of the micrometer screw 29 by means of the milled head 36 effects a very fine adjustment of the width of the orifice 27, by virtue of the differential action of the two parts 30, 31 of the screw 29.

The edges of the plates 28 are bevelled to form a small chamber 39 preceding the extrusion slit 27. The chamber 39 communicates with the longitudinal passage 22 by means of a large number of smaller passages 40 in the block 21. The ends of the block 21 are covered with end plates 41 closing the ends of the chamber 22 and end plates 42 closing the chamber 39 and the slit 27. The form of the end plates 42 is shown in Figure 3 in which it will be seen that the plate comes down to the point 43 coinciding with the end of the extrusion slit 27. The two end plates 42 are held in position by means of longitudinal rods 44 stretching from one end plate to the other.

Passages 46 are provided in the unoccupied corners of the block 21 for the purpose of heating the block. Heating fluid may be introduced into the passages by an entry 47 in the middle of the block, leaving by exits 48 at each end of the block or vice versa. The passages 46 are bored from end to end of the block 21, the ends being blocked as at 49. Trunnions 50 are provided on the end plates 41 for the convenient support and manipulation of the extrusion apparatus.

In order to minimize the possibility of lines appearing in the extruded product corresponding to the spaces between the passages 40, the extrusion slit 27 may be formed in the manner indicated in Figure 4, in which, prior to reaching the extrusion slit 27, the extruded material passes through a throat 51 and into a small chamber 52, the smoothing effect of passing the solution through a narrow slit being doubled by the provision of the throat 51.

Referring to Figures 7 to 14, a block 60 of roughly triangular form is provided to the lower faces of which plates 28 forming between them the extrusion orifice 27 are secured. A number of passages 61 passing through the block form a communication between a space 62 lying just before the extrusion slit 27 and a longitudinal passage 63 to which the spinning solution is supplied by means of a pipe 64. The adjustment of the width of the extrusion slit 27 is effected by means of differential micrometer screws 29 similar in principle to that illustrated with reference to Figures 1 and 2.

Brackets 65, 66 respectively secured to the block 60 and the plates 28 are provided to carry the trunnions 32, 33 through which the micrometer screw 29 passes. The trunnion 32 projects from the bracket 65 to which it is secured by means of a set screw 67.

The block 60 is carried by means of trunnions 68 at each end. End plates 69 are employed to close the ends of the chamber 62, the end plates being secured to the block by means of bolts 70. Heating passages 71 are provided in the corners and across the ends of the block 60, the passages forming a complete circuit through which a heating fluid is circulated by means of the pipes 72, 73 on each side of the block.

Various forms of apparatus for preventing the appearance of lines in the final product corresponding to the passages 61 are illustrated in Figures 9 to 12.

In Figure 9 a rod 75 is closely wrapped with several turns of fine wire gauze 76 and is placed inside the space 62. The wire gauze splits up the spinning solution which is compelled to pass through it into a very great number of minute streams and so breaks up any "stream-lining" effect which might be produced by the passages 61.

Figures 10 and 11 are a side elevation and a sectional elevation of a piece of apparatus for a similar purpose. The apparatus is made in two parts 78, 79 of which only one is shown in Figure 10. The solution leaving the passages 61 is caused to enter the passages 80 formed between the two pieces 78, 79. At their upper ends the passages 80 are substantially circular in section, but as they descend the section becomes longer and narrow until it reaches the form of a continuous slit 81 from which the solution is delivered for passage through the extrusion slit 27. By this means the solution is gently conducted from the ends of the passages 61 to the slit 27.

Figure 12 shows a further piece of apparatus for a similar purpose. There are again two parts 82, 83 and between them is a continuous converging slit 84. At intervals along the length of the slit 84 enlargements 85 of conical form are made at the upper edge of the slit 84.

What we claim and desire to secure by Letters Patent is:—

1. Apparatus for the extrusion of sheets, films, foils and the like, said extrusion apparatus comprising a solid body of material having flat surfaces adapted to form a rigid support for plate-like members constituting the jaws of an extrusion slit, said body being formed with a longitudinal passage running along the length of said slit and communicating therewith through a series of smaller passages so as to feed the material to the whole of said slit.

2. Apparatus for the extrusion of sheets, films, foils, and the like, said extrusion apparatus comprising a solid body of material having flat surfaces adapted to form a rigid support for plate-like members constituting the jaws of an extrusion slit, said body being formed with an internal longitudinal passage running along the length of said slit and communicating therewith through a series of smaller passages so as to feed the material to be extruded to the whole of said slit.

3. Apparatus for the extrusion of sheets, films, foils and the like, said extrusion apparatus comprising a solid body of material adapted to form a rigid support for plate-like members constituting the jaws of an extrusion slit, said body being formed with a longitudinal passage running along the length of said slit and communicating therewith through a series of smaller passages, and means between the ends of said smaller passages and the extrusion slit for redividing and redistributing the material to be extruded so as to distribute it uniformly along the length of said slit.

4. Apparatus for the extrusion of sheets, films, foils and the like, said extrusion apparatus comprising a solid body of material on which is formed an extrusion slit, said body being formed with an internal longitudinal passage running along the length of said slit and communicating therewith through a series of smaller passages, and means between the ends of said smaller passages and the extrusion slit for redividing and redistributing the material to be extruded so as to distribute it uniformly along the length of said slit.

5. Apparatus for the extrusion of sheets, films, foils and the like, said extrusion apparatus comprising a solid body of material adapted to form a rigid support for plate-like members constituting the jaws of an extrusion slit, said body being formed with a longitudinal passage running along the length of said slit and communicating therewith through a series of smaller passages, and a rod wound with several thicknesses of wire gauze disposed between said smaller passages and the extrusion slit and adapted to redivide and redistribute the material to be extruded so as to distribute it uniformly along the length of said slit.

6. Apparatus for the extrusion of sheets, films, foils and the like, said extrusion apparatus comprising a solid body of material adapted to form a rigid support for plate-like members constituting the jaws of an extrusion slit, said body being formed with a longitudinal passage running over the length of said extrusion slit, and having a number of smaller passages communicating from said passage to a narrow slot-like passage through which the material to be extruded must pass before reaching the extrusion slit, so as to distribute the material to be extruded uniformly along the length of said slit.

7. Apparatus for the extrusion of sheets, films, foils and the like, said extrusion apparatus comprising a solid body of material having flat surfaces adapted to form a rigid support for plate-like members constituting the jaws of an extrusion slit, said body being formed with a longitudinal passage running along the length of said slit and communicating therewith through a series of smaller passages so as to feed the material to be extruded to the whole of said slit, and passages in said body for the circulation of a heating medium.

8. Apparatus for the extrusion of sheets, films, foils and the like, said extrusion apparatus comprising a solid body of material having flat surfaces adapted to form a rigid support for plate-like members constituting the jaws of an extrusion slit, said body being formed with an internal longitudinal passage running along the length of said slit and communicating therewith through a series of smaller passages so as to feed the material to be extruded to the whole of said slit, and passages in said body for the circulation of a heating medium.

9. Apparatus for the extrusion of sheets, films, foils and the like, said extrusion apparatus comprising a solid body of material having flat surfaces adapted to form a rigid support for plate-like members constituting the jaws of an extrusion slit, said body being formed with a longitudinal passage running along the length of said slit and communicating therewith through a series of smaller passages so as to feed the material to be extruded to the whole of said slit, and a differential screw adjustment for at least one of said plate-like members for the purpose of adjusting the width of the extrusion slit.

EDWARD KINSELLA.
ROBERT JABEZ WARD.